United States Patent
Soriente et al.

(10) Patent No.: US 11,451,517 B2
(45) Date of Patent: Sep. 20, 2022

(54) SECURE AND AUDITABLE PROXY TECHNOLOGY USING TRUSTED EXECUTION ENVIRONMENTS

(71) Applicant: NEC Laboratories Europe GmbH, Heidelberg (DE)

(72) Inventors: Claudio Soriente, Madrid (ES); Hien Truong, Heidelberg (DE)

(73) Assignee: NEC Corporation, Tokyo (JP)

( * ) Notice: Subject to any disclaimer, the term of this patent is extended or adjusted under 35 U.S.C. 154(b) by 202 days.

(21) Appl. No.: 16/884,071

(22) Filed: May 27, 2020

(65) Prior Publication Data

US 2021/0377224 A1 Dec. 2, 2021

(51) Int. Cl.
*H04L 29/06* (2006.01)
*H04L 9/40* (2022.01)
*G06F 21/53* (2013.01)
*H04L 9/32* (2006.01)

(52) U.S. Cl.
CPC .......... *H04L 63/0281* (2013.01); *G06F 21/53* (2013.01); *H04L 9/3247* (2013.01); *H04L 63/0442* (2013.01); *H04L 63/18* (2013.01)

(58) Field of Classification Search
CPC . H04L 63/0281; H04L 63/0442; H04L 63/18; H04L 9/3247; G06F 21/53
See application file for complete search history.

(56) References Cited

U.S. PATENT DOCUMENTS 10,453,017 B1 * 10/2019 Richards .............. G06F 16/285
11,265,702 B1 * 3/2022 Paczkowski .......... H04W 12/06
2014/0317686 A1 * 10/2014 Vetillard ................ G06F 21/74 726/2
2015/0288719 A1 * 10/2015 Freudiger ........... H04L 63/0272 726/12
2015/0319149 A1 * 11/2015 Alshammari ......... H04L 9/0869 713/171
2017/0169227 A1 * 6/2017 Rajcan .................. G06F 9/4416
2019/0089676 A1 * 3/2019 Gigov ................ H04L 63/0807
2019/0266330 A1 * 8/2019 Thaler, III ............ G06F 21/554
2021/0240817 A1 * 8/2021 Duan .................. G06F 12/0813

OTHER PUBLICATIONS

"What is a Gateway and What Does it Do?" The Wayback Machine—https://web.archive.org/web/20190912083348/https://whatismyipaddress.com/gateway (Year: 2019).*
Anati, Ittai et al., "Innovative Technology for CPU Based Attestation and Sealing," Intel Corporation, Aug. 14, 2013.

* cited by examiner

*Primary Examiner* — Joseph P Hirl
*Assistant Examiner* — Ka Shan Choy
(74) *Attorney, Agent, or Firm* — Leydig, Voit & Mayer, Ltd.

(57) ABSTRACT

A method for secure proxying using trusted execution environment (TEE) technology includes performing, using a TEE running on a proxy, an attestation with a TEE running on a client. The TEE running on the proxy receives from the TEE running on the client a request to fetch data from a remote server. The TEE running on the proxy fetches the data specified in the request from the remote server. The TEE running on the proxy forwards to the TEE running on the client the data fetched from the remote server.

20 Claims, 2 Drawing Sheets

SECURE AND AUDITABLE PROXY TECHNOLOGY USING TRUSTED EXECUTION ENVIRONMENTS

FIELD

The present invention relates to a method and system for using a proxy in a network, in particular, the Internet, for privacy and/or to avoid censorship, in a secure and auditable manner utilizing trusted execution environments (TEEs).

BACKGROUND

Due to security concerns which always exist in computer networks, and increasing threats of censorship and surveillance by monitoring and tracking network traffic and activities, more and more clients have started to turn their attention to tools that help protect their privacy. Proxies are used by clients in computer networks, in particular the Internet, for example in order to enhance privacy and/or to avoid censorship based on Internet Protocol (IP). Proxies can be set up using web proxies, virtual private networks (VPNs) or anonymizing networks, and allow the client to tunnel its network traffic through the proxy.

SUMMARY

In an embodiment, the present invention provides a method for secure proxying using trusted execution environment (TEE) technology. A TEE running on a proxy performs an attestation with a TEE running on a client. The TEE running on the proxy receives from the TEE running on the client a request to fetch data from a remote server. The TEE running on the proxy fetches the data specified in the request from the remote server. The TEE running on the proxy forwards to the TEE running on the client the data fetched from the remote server.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
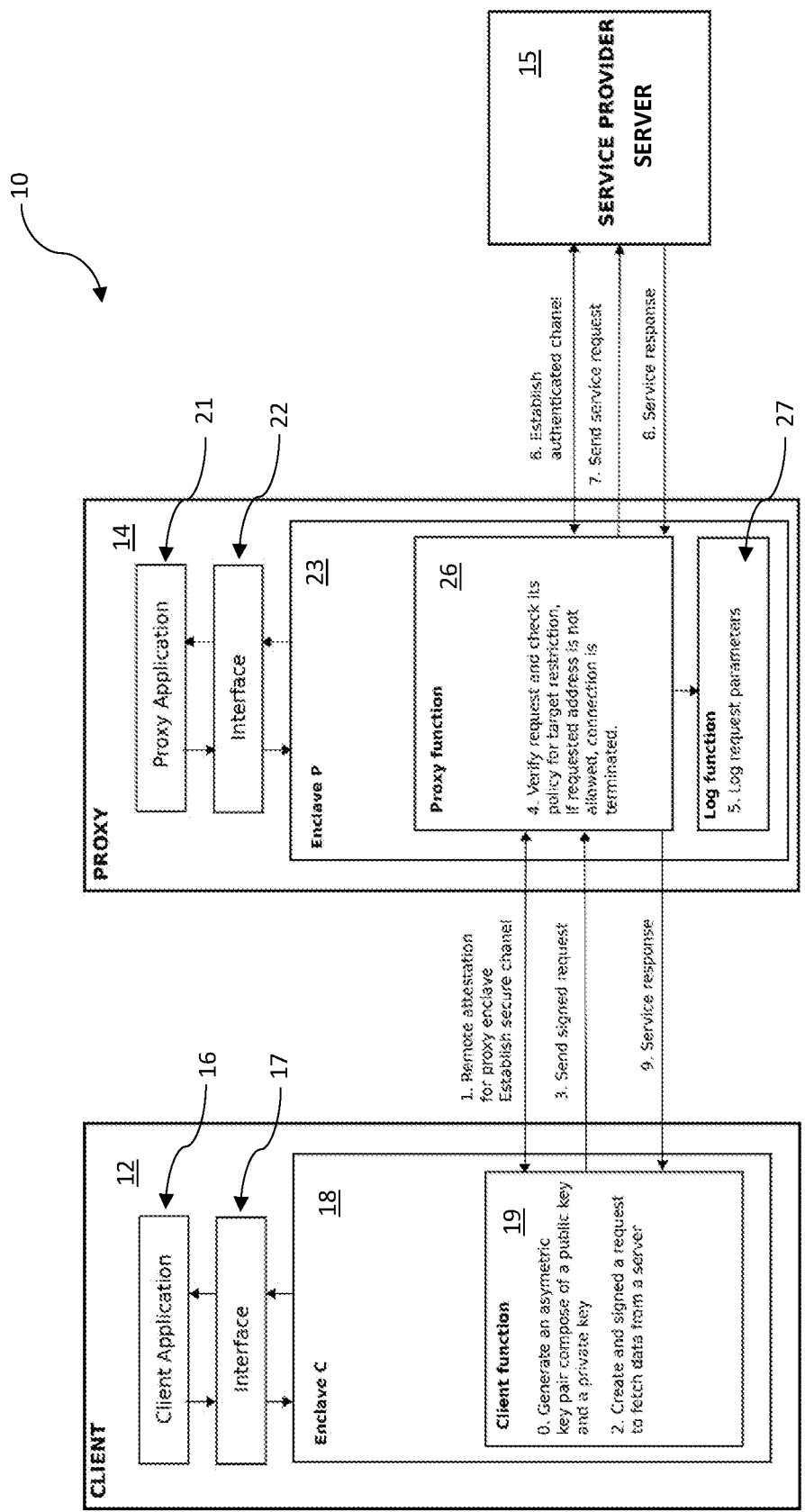
FIG. 1 schematically illustrates a method and system for secure and auditable proxying according to an embodiment of the present invention.

Embodiments of the present invention provide an improved proxying protocol which utilizes trusted execution environments (TEEs) technology. Proxying allows a network-enabled device of a client A to operate privately or anonymously and/or to circumvent (IP-based) censorship by tunneling its traffic through another network-enabled device B, such as a remote server, which serves as the proxy. However, proxying according to existing protocols cannot effectively guarantee integrity or proper liability for the generated network traffic. In terms of integrity, the client A is exposed to malware or other harmful code that the proxy B could inject into the network traffic intended for the client A. In terms of liability, if the proxy B fetches illegal data on behalf of the client A, the operator of the proxy B may not be able to prove to a third party that it was actually serving a request from the client A. To address these technical deficiencies of current proxying protocols, and to increase security for the clients and allow for auditability for the proxies, embodiments of the present invention provide the improved proxying protocol which utilizes the TEEs trusted to ensure integrity and liability of proxied network traffic.

Proxy technologies, such as web proxies, virtual private networks (VPNs) and anonymizing networks, allow a client to circumvent Internet censorship by routing the client's network traffic through a proxy. For example, when the client A wants to fetch data from a server S, rather than creating a direct connection to the server S, the client A first creates a connection to a proxy B, and then requests the proxy B to create a connection to the server S. As a result, all traffic between the client A and the server S is tunneled through the proxy B. Further, it may not be possible for an eavesdropper to recognize that the client A is fetching data from the server S.

The inventors have recognized that this scenario of using a proxy according to existing proxy technology and proxying protocols has two main flaws. First, the client A has no guarantees on the integrity of the data fetched from the server S. In particular, the proxy B may inject malware or other harmful code, or could simply send the client A fabricated or false data. Second, there is no evidence available for the proxy B to prove, for example should it be required by law, that a request for a particular piece of data was generated while serving a request from the client A. For example, if the data requested to be retrieved by the client A is illegal to access or if the server S operates an illegal website and a network log (for example, from an Internet Service Provider (ISP)) shows that the proxy B has fetched illegal data from the server S, then the proxy B has no means to prove that it was acting as a proxy and actually fetching the illegal data on behalf of the client A.

Embodiments of the present invention provide improved proxy technology and proxying protocol utilizing TEEs in order to: (a) allow the clients to check the integrity of data fetched from servers via proxies, and (b) allow the proxies to prove to third parties that a connection to a specific server was initiated on behalf of a particular client.

In particular, according to embodiments of the present invention, TEEs, such as INTEL SGX, are installed on the network-enabled devices of the clients and proxies. The devices of the clients and proxies can be any network-enabled computer device. Typically, the clients are smartphones, tablets, laptops or personal computers and the proxies are servers, for example remotely located or in running in the cloud. Software and code are executed in the secure TEEs running on the client and proxy devices. In INTEL SGX, the TEEs are referred to as enclaves. The terms TEE and enclave are used interchangeably herein and both refer to the secure environment on the devices running the software and code. The expressions TEEs and enclave, as well as secure environment, trusted space or trusted container, as used herein refer to areas running on machines/devices which are able to execute code in isolation from the rest of the software running on the same machine/device.

According to embodiments of the present invention, client enclaves attest proxy enclaves in order to verify their trustworthiness and create a secure channel between the two enclaves. Attestation of the proxy enclave ensures that requests from the client enclave are received by a trustworthy enclave and, therefore, processed without tampering. Requests from the client are tunneled through the secure channel towards the proxy enclave. The proxy enclave establishes a connection to the server and fetches data on behalf of the client. As a result, data is tunneled from the client enclave, to the proxy enclave and to the server. The channel between the client enclave and the proxy enclave is secured by the secure channel established during enclave attestation. The channel between the proxy enclave and the server is secured by standard means, for example using Transport Layer Security (TLS).

An example of attestation for enclaves is provided in Anati, Ittai, et al., "Innovative Technology for CPU Based Attestation and Sealing," INTEL CORPORATION (2013), which is hereby incorporated by reference herein. The TEE, e.g., INTEL SGX, supports enclave attestation via its hardware instructions. Attestation for enclaves allows to assert trustworthiness of an enclave by verifying enclave identity and an enclave report. At its initialization (launching phase), two enclave identities, e.g., MRENCLAVE and MRSIGNER, are created. MRENCLAVE is a SHA-256 value of enclave code, data and other measurements when the enclave is built. MRSIGNER is the second enclave identity which includes sealing authority (an entity that signs the enclave). The two enclave identities are created by the trusted computing base (TCB), a hardware component of INTEL SGX security architecture. INTEL SGX provides instructions to create REPORT, a signed structure which includes enclave identities, user data and other additional enclave attributes, for the attestation process. The user data field in the REPORT contains binding information of enclave identities and data inside the enclaves and additional information, e.g., public Diffie-Hellman keys to form a secure channel between the enclave and another enclave. INTEL SGX provides two attestation mechanisms: intra-platform (local) enclave attestation and inter-platform (remote) attestation. In local attestation, the REPORT is signed by a symmetric key. In remote attestation, INTEL SGX provides a special enclave called a quoting enclave. The quoting enclave verifies REPORT and then creates a QUOTE and signs it with asymmetric key. The signed QUOTE is sent to verifying enclave. Verifying enclave needs to communicate with a trusted third party, e.g., INTEL Attestation Service (IAS) to verify this QUOTE.

The client enclave may also authenticate its requests, e.g., by means of a digital signature scheme, so that the proxy enclave can prove to a third party that a connection to a given server was made to serve a request from the client.

The proxy enclave may also deny the request from the client enclave based on an arbitrary policy set by the operator of the proxy enclave. For example, the proxy enclave may deny to proxy network traffic towards websites with adult content.

The secure proxying protocol according to an embodiment of the present invention is executed by the devices of the client and proxy, where each machine has a TEE, also referred to herein as a trusted space or an enclave, to securely create and process requests and responses. A request to a remote server from the client traverses via the proxy. Advantageously, the fundamental functions of proxying protocol are executed inside the TEEs. Clients attest trustworthiness of proxies before sending requests. Proxies control upcoming requests by accepting or denying them, and are able to prove at a later time to an auditing party of any fetching activities they have performed on behalf of clients.

In an embodiment, the present invention provides a method for secure proxying using trusted execution environment (TEE) technology. A TEE running on a proxy performs an attestation with a TEE running on a client. The TEE running on the proxy receives from the TEE running on the client a request to fetch data from a remote server. The TEE running on the proxy fetches the data specified in the request from the remote server. The TEE running on the proxy forwards to the TEE running on the client the data fetched from the remote server.

In an embodiment, the method further comprises logging information about the request to fetch the data in the TEE running on the proxy.

In an embodiment, the information logged in the TEE running on the proxy includes an Internet Protocol (IP) address of the client.

In an embodiment, the information logged in the TEE running on the proxy includes information about a client signature.

In an embodiment, the request to fetch data includes a Uniform Resource Locator (URL), and the information logged in the TEE running on the proxy further includes the URL.

In an embodiment, communications between the TEE running on the proxy and the TEE running on the client take place over a secure channel established by the attestation using a shared secret generated based on successful attestation.

In an embodiment, the request includes a public key of the client generated through initialization of the TEE on the client, and the method further comprises receiving, by the TEE running on the proxy, the public key of the client and logging the public key together with information about the request to fetch data in the TEE running on the proxy.

In an embodiment, the request is signed by the TEE running on the client using a private key generated through initialization of the TEE on the client, and the method further comprises verifying the signature using a public key generated through initialization of the TEE on the client and included in the request to fetch the data.

In an another embodiment, the present invention provides a proxy comprising memory and one or more processors which, alone or in combination, are configured to provide for execution of the following steps using a trusted execution environment (TEE) running on the proxy: performing an attestation with a TEE running on a client; receiving, from the TEE running on the client, a request to fetch data from a remote server; fetching the data specified in the request from the remote server; and forwarding, to the TEE running on the client, the data fetched from the remote server.

In an embodiment, the TEE running on the proxy includes a log, and the proxy is further configured using the TEE to write information about the request to fetch the data in the log.

In an embodiment, the information logged in the TEE running on the proxy includes an Internet Protocol (IP) address of the client and information about a client signature.

In an embodiment, the proxy is further configured using the TEE to check a policy to determine whether the request to fetch the data is restricted.

In a further embodiment, the present invention provides a client comprising memory and one or more processors which, alone or in combination, are configured to provide for execution of the following steps using a trusted execution environment (TEE) running on the client: performing an attestation with a TEE running on a proxy; creating and signing a request to fetch data from a remote server; sending the request to fetch data to the TEE running on the proxy; and receiving the data specified in the request from the remote server via the TEE running on the proxy.

In an embodiment, the request to fetch the data is signed using a private key generated through initialization of the TEE on the client, and a public key which serves as an identity of the client is generated through initialization of the TEE on the client and is sent to the TEE running on the proxy with the request to fetch the data, the private key and the public key each being stored in the TEE running on the client, and the request to fetch the data is sent to the TEE running on the proxy over a secure channel established based on successful attestation using a shared secret.

In a further embodiment, the present invention provides a tangible, non-transitory computer-readable medium having instructions thereon which, upon being executed by one or more processors, alone or in combination, provide for execution of a method according to any embodiment of the present invention.

FIG. 1 shows a method and system 10 implementing the proxying protocol according to an embodiment of the present invention including the communications involved. Access from a client 12 to a remote server 15 is routed via a proxy 14. Preferably, each of the devices of the client and proxy supports TEEs which allow to create a trusted container to hold trusted (verified) source code. The server could also support or run TEEs, but do not have to according to an embodiment. The client 12 is a machine/device that has a demand to fetch data from the server 15. The proxy 14 is a machine/device that performs the data fetching from the server 15 on behalf of the client 12. The proxy 14 receives a request for the data from the client 12, verifies it, and relays it to the server 15. The proxy then receives the response from the server 15 and forwards it to the client 12. The server 15 is a service provider which hosts websites.

As mentioned above, each of the machines/devices of the client 12 run TEEs providing the trusted container, also referred to herein as enclaves. The client enclave 18 is the TEE setup on the client 12. The proxy enclave 23 is the TEE setup on the proxy 14. The proxy enclave 23 of the proxy 14 includes a log 27. The log 27 is a data entity which could be a database or an Extensible Markup Language (XML) file that stores a history of proxying actions. The client enclave 18 executes the code for implementing the respective steps of the proxying protocol inside the trusted container for the client function 19. The proxy enclave 23 executes the code for implementing the respective steps of the proxying protocol inside the trusted container for the proxy function 26.

The proxying protocol includes two phases: a setup phase and a proxying phase. During the setup phase, first, the client 12 and the proxy 14 initiate their respective enclaves 18, 23 that contain source code of client and proxy functions. The client application 16 includes code for initiating an enclave. For example, an operating system (OS) kernel on a TEE-supported device handles an enclave creation request as a system call to a central processing unit (CPU). Interfaces 17, 22, e.g., provided by the TEE, e.g., INTEL SGX allows the client application 16 and the proxy application 21, respectively, and only these applications, to interact with the enclaves 18, 23. The code from the respective applications 16, 21 that has to be run in isolation is transferred to the respective enclave 18, 23 during the initiation phase. Next, in a step 0, the client enclave 18, through being created or initialized (e.g., during or after the creation/initialization), generates a public/private key pair <pk, sk> and stores the keys inside the client enclave 18. Step 0 is performed only once when the client application 16 is initiated. The public key serves as the client's identity and can be later used to make the client 12 liable for unpermitted or unlawful requests it sent to the proxy 14. The private key is used by the client 12 to digitally sign its requests to the proxy 14. The client application 16 running on the client 12 locally interacts with its own enclave 18 to execute a proxying request to the server 15 provider via the proxy 14. With each request, as shown in step 1, the client enclave 18 attests proxy enclave 23. In attestation protocol, the proxy 14 needs to convince the client 12 that it is a genuine trusted execution running on an up-to-date platform. Depending on the attested attributes of the proxy enclave 23, the client 12 decides whether to trust the proxy 14 or not. A successful remote attestation protocol results in a shared secret that is used as a basic element for a secure channel between the client 12 and the proxy 14. The request from the client 12 (step 3) and the response from the proxy 14 (step 9) are transmitted via this secure channel. Accordingly, the secure channel is setup based on a key exchange protocol, such as Diffie-Hellman. In this case, the common secret key is created from public Diffie-Hellman keys provided by the client 12 and the proxy 14.

Thus, in the setup phase, both the client 12 and the proxy 14 remotely attest each other before commencement of the proxying phase. Also, in the setup phase (e.g., during or after the creations/initialization of the TEEs), the client enclave 18 and the proxy enclave 23 each generate public/private key pairs and store the keys inside the respective enclaves 18, 23. Later, once remote attestation has successfully completed and the shared secret has been created, the client 12 can send a number of proxying requests to the proxy 14 for data on the server 15. Step 1 is performed when the client 12 begins a session with one or more requests to the proxy 14 to fetch data. Other steps are performed for each request of the client 12 to fetch data from a server 15 via the proxy 14. The client enclave 18 and the proxy enclave 23 exchange information that is required by the TEE technology, such as INTEL SGX. In the example provided above, attestation fails when the REPORT or QUOTE is not verified. When the attestation fails, communication between the client 12 and the proxy 14 is ceased immediately.

Preferably, step 1 considers both attestations: the client application 16 attests the proxy enclave 23, and the proxy application 21 attests the client enclave 18. In the case that an asymmetric public/private key pair was also generated by the proxy 14 through initialization of the proxy enclave 23, the public key can serve as the proxy's identity and the private key can be used to sign results return by the proxy 18. In another embodiment, the proxy 14 is not required to perform attestation or generate and store a key pair through creation/initialization of the proxy enclave 23. The client key pair, however, generated through the creation/initialization of the client enclave 18 and secretly stored therein provides for a number of advantages in embodiments of the present invention since the public key of the client 12 is used as its identity and is stored in the log 27 of the proxy 14, and since the private key of the client 12 is used to sign the requests to the proxy 14.

In steps 2 and 3 of FIG. 1, illustrating commencement of the proxying phase, a fetching request created and signed by client enclave 18 is sent to proxy enclave 23 via the secure channel. Upon arrival of the request from the client enclave 18, in step 4 executed by source code of the proxy function 26 running in the proxy enclave 23, the proxy enclave 23 first verifies the request, checks the client's signature and checks its own policy for any access restriction indicating data or clients it is restricted from fetching (most commonly particular websites or data, but also possibly clients or types of clients). If the target of the request is restricted, the proxy enclave 23 refuses the request and terminates the communication with the client 12. If the policy check passes, in step 5, the proxy enclave 23 logs the request parameters in the log 27, which is also located in the proxy enclave 23. The added log entry in the log 27 preferably includes the IP address of the client 12, a hash of the request, the client's signature, the fetched data (e.g., Uniform Resource Locator (URL)) and a timestamp. Next, in step 6, the proxy enclave 23 establishes a HyperText Transfer Protocol (HTTP) channel with the server 15. Then, in step 7, the proxy enclave 23 creates and sends a request to fetch data from the server 15 based on information in the request from the client enclave 18. Because the source code of the proxy function 26 run inside the proxy enclave 23 is trusted based on a successful attestation, it is advantageously assured that the proxy 14 will not misbehave and will retrieve exactly the data specified in the client's request from the client enclave 18. Finally, in step 8, the proxy enclave 23 receives a response from the server 15 and forwards it back to the client enclave 18 which then returns the response to the client application 16 running on the client 12 via interface 17. By the design described herein, the client 12 trusts the enclave running on the proxy 14, and the communication channel between the client 12 and the proxy 14 is secure; thus, the data is not tampered.

Figure 2:
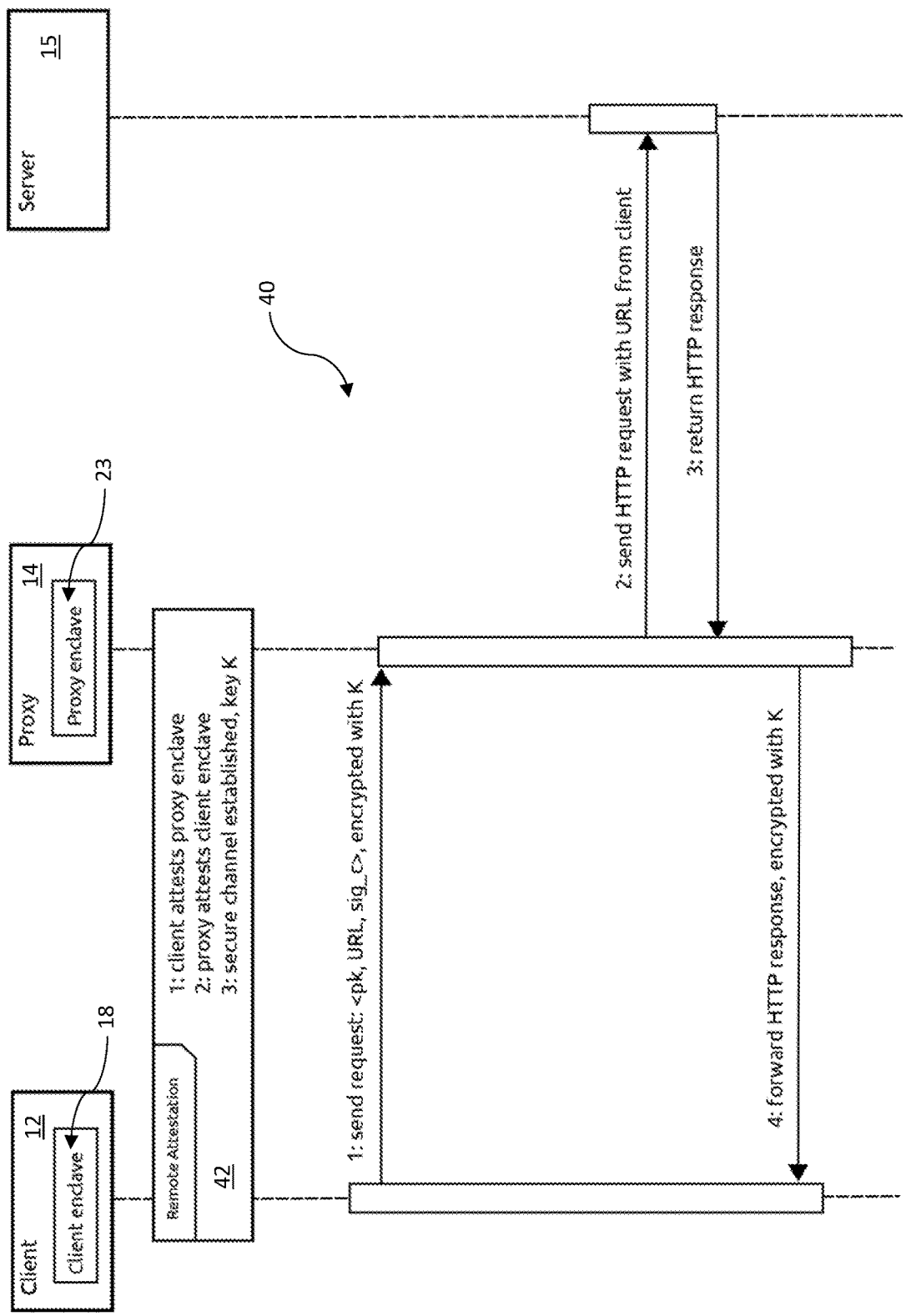
FIG. 2 is a message sequence diagram for a proxying protocol according to an embodiment of the present invention.

FIG. 2 illustrates a communication protocol 40 for how messages are exchanged among the entities in the proxying protocol of FIG. 1. In a step 1 of the communication protocol 40, the client 12 sends one or more requests to the proxy 14 via the secure channel and the respective enclaves 18, 23 after remote attestation 42 in the setup phase was successful. The request message preferably contains the public key pk of the client 12, a URL to fetch data from, and a signature sig_c of the client created on the pair of the public key and URL <pk, URL> with the private key sk of the client 12. The request message is signed by the client enclave 18 with the signature sig_c and the proxy 14 verifies the client's signature for every message received from the client 12. The signature is created by client 12 using its private key and is publicly verified by using its public key. The proxy 14 does not know the client's private key, which is kept secretly inside client enclave 18. The client's public key is included in the request. Messages between the client 12 and the proxy 14 are encrypted and authenticated with the key K established during the remote attestation 42, which is in this embodiment the shared secret for the secure channel. In a step 2 of the communication protocol 40, the proxy 14 relays the request via another channel with the server 15, for example, using an HTTP channel. In a step 3 of the communication protocol 40, the proxy 14 receives the response from the server 15, for example via the HTTP channel, and then, in a step 4 of the communication protocol 40, and forwards the result to client 12. The foregoing steps of the communication protocol 40 involving the client 12 and the proxy 14 are performed using the respective enclaves 18, 23 of the client 12 and the proxy 14, as discussed above with reference to FIG. 1.

Advantageously, the proxying protocol is auditable since, at any time, a third party is able to audit past activities, for example, as required by law or in case of a dispute against the proxy 14 for an illegal access. To verify whether the proxy 14 has requested a specific website URL from a server 15 on behalf of the client 12 (as opposed to on behalf of itself or other clients), the auditing party queries the log 27 of the proxy enclave 23 via its application programming interface (API), and therefore via the proxy application 21 and interface 22. Given a specific query parameters, the proxy 14 searches and extracts a log entry stored inside the log 27 of the proxy enclave 23. If the log entry is found and indicates the request was made on behalf of the client 12, then the client 12 can be made liable. Otherwise, without such evidence, the proxy 14 would be held responsible for the illegal access claim.

Embodiments of the present invention provide for one, some or all of the following advantages and improvements:

1) Integrating a proxy and client in trusted execution environments so that (i) clients are assured of the integrity of data fetched via the proxy; and (ii) requests to proxies are authenticated and uniquely bound to the client identity (using its public key).
2) Creating a tamper-proof and authenticated log of proxy requests served by the trusted execution environment so that third parties can audit the activity of the proxy service and verify client's requests that were served/denied.

According to an embodiment of the present invention, a method for secure and auditable proxy protocol comprises the steps of:

1) Attesting, by a client enclave, the status of the proxy enclave at a remote host and establishment of a secure channel between the client and the proxy; client-proxy communication of subsequent steps will use this channel.
2) Attesting, by the proxy enclave, the client enclave.
3) Sending, by the client enclave, a request for the proxy enclave to fetch data from a server (e.g., by specifying a URL).
4) Fetching, by the proxy enclave, the data from the URL in the request of step 3).
5) Preferably, logging, by the proxy enclave, the request of step 3).
6) Forwarding, by the proxy enclave, the data fetched at step 4) to the client enclave.

Embodiments of the present invention improve proxy technology and proxying protocol in comparison to existing technologies which lack of both integrity assurance of fetched data for clients and liability evidence for proxies. Embodiments of the present invention allow clients to address and overcome threats of personal data being stolen, data manipulation (for example, ad injection, traffic interception), etc. by malicious proxies. Prior to the present invention, there was no technical way for clients to avoid malicious activities by proxies. On the other side, embodiments of the present invention allow proxies to address and overcome threats of liability when accessing illegal content on behalf of clients. Prior to the present invention, there was no technical way for proxies to prove it has fetched a data on behalf of some client.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for secure proxying using trusted execution environment (TEE) technology, the method comprising:
    performing, using a TEE running on a proxy, an attestation with a TEE running on a client;
    receiving, at the TEE running on the proxy from the TEE running on the client, a request to fetch data from a remote server;
    fetching, by the TEE running on the proxy, the data specified in the request from the remote server; and
    forwarding, by the TEE running on the proxy to the TEE running on the client, the data fetched from the remote server, wherein:
    the request includes a public key of the client generated through initialization of the TEE on the client, the method further comprising receiving, by the TEE running on the proxy, the public key of the client and logging the public key together with information about the request to fetch data in the TEE running on the proxy, and/or
    the request is signed by the TEE running on the client to provide a signature using a private key generated through initialization of the TEE on the client, the method further comprising verifying the signature using a public key generated through initialization of the TEE on the client and included in the request to fetch the data.

2. The method according to claim 1, wherein the request to fetch the data includes a Uniform Resource Locator (URL) of the data to be fetched, and wherein the TEE running on the proxy does not reveal an Internet Protocol (IP) address of the client to the remote server.

3. The method according to claim 2, wherein the information logged in the TEE running on the proxy includes the IP address of the client.

4. The method according to claim 3, wherein the information logged in the TEE running on the proxy includes information about the signature.

5. The method according to claim 3, wherein the request to fetch the data includes the URL, and wherein the information logged in the TEE running on the proxy further includes the URL.

6. The method according to claim 1, wherein communications between the TEE running on the proxy and the TEE running on the client take place over a secure channel established by the attestation using a shared secret generated based on successful attestation.

7. The method according to claim 1, wherein the request includes the public key of the client generated through initialization of the TEE on the client, the method further comprising receiving, by the TEE running on the proxy, the public key of the client and logging the public key together with information about the request to fetch data in the TEE running on the proxy.

8. The method according to claim 1, wherein the request is signed by the TEE running on the client using the private key generated through initialization of the TEE on the client, the method further comprising verifying the signature using the public key generated through initialization of the TEE on the client and included in the request to fetch the data.

9. The method according to claim 1, wherein the request includes the public key of the client generated through initialization of the TEE on the client, and wherein the request is signed by the TEE running on the client using the private key generated through initialization of the TEE on the client, the method further comprising:
    receiving, by the TEE running on the proxy, the public key of the client and logging the public key together with information about the request to fetch data in the TEE running on the proxy, and
    verifying the signature using the public key generated through initialization of the TEE on the client and included in the request to fetch the data.

10. A proxy comprising memory and one or more processors which, alone or in combination, are configured to provide for execution of a method using a trusted execution environment (TEE) running on the proxy, the method comprising:
    performing an attestation with a TEE running on a client;
    receiving, from the TEE running on the client, a request to fetch data from a remote server;
    fetching the data specified in the request from the remote server; and
    forwarding, to the TEE running on the client, the data fetched from the remote server, wherein:
    the request includes a public key of the client generated through initialization of the TEE on the client, the method further comprising receiving, by the TEE running on the proxy, the public key of the client and logging the public key together with information about the request to fetch data in the TEE running on the proxy, and/or
    the request is signed by the TEE running on the client to provide a signature using a private key generated through initialization of the TEE on the client, the method further comprising verifying the signature using a public key generated through initialization of the TEE on the client and included in the request to fetch the data.

11. The proxy according to claim 10, wherein the request to fetch the data includes a Uniform Resource Locator (URL) of the data to be fetched, and wherein the TEE running on the proxy is further configured to fetch the data without revealing an Internet Protocol (IP) address of the client to the remote server.

12. The proxy according to claim 11, wherein the information logged in the TEE running on the proxy includes the IP address of the client.

13. The proxy according to claim 10, wherein the proxy is further configured using the TEE to check a policy to determine whether the request to fetch the data is restricted.

14. The proxy according to claim 10, wherein the request includes the public key of the client generated through initialization of the TEE on the client, the method further comprising receiving, by the TEE running on the proxy, the public key of the client and logging the public key together with information about the request to fetch data in the TEE running on the proxy.

15. The proxy according to claim 10, wherein the request is signed by the TEE running on the client using the private key generated through initialization of the TEE on the client, the method further comprising verifying the signature using the public key generated through initialization of the TEE on the client and included in the request to fetch the data.

16. The proxy according to claim 10, wherein the request includes the public key of the client generated through initialization of the TEE on the client, and wherein the request is signed by the TEE running on the client using the private key generated through initialization of the TEE on the client, the method further comprising:
receiving, by the TEE running on the proxy, the public key of the client and logging the public key together with information about the request to fetch data in the TEE running on the proxy, and
verifying the signature using the public key generated through initialization of the TEE on the client and included in the request to fetch the data.

17. The proxy according to claim 10, wherein the information logged in the TEE running on the proxy includes the URL.

18. The proxy according to claim 10, wherein the information logged in the TEE running on the proxy includes information about the signature.

19. A client comprising memory and one or more processors which, alone or in combination, are configured to provide for execution of the following steps using a trusted execution environment (TEE) running on the client:
performing an attestation with a TEE running on a proxy;
creating and signing a request to fetch data from a remote server;
sending the request to fetch data to the TEE running on the proxy; and
receiving the data specified in the request from the remote server via the TEE running on the proxy,
wherein the request to fetch the data is signed using a private key generated through initialization of the TEE on the client, wherein a public key which serves as an identity of the client is generated through initialization of the TEE on the client and is sent to the TEE running on the proxy with the request to fetch the data, the private key and the public key each being stored in the TEE running on the client, and wherein the request to fetch the data is sent to the TEE running on the proxy over a secure channel established based on successful attestation using a shared secret.

20. A tangible, non-transitory computer-readable medium having instructions thereon which, upon being executed by one or more processors, alone or in combination, provide for execution of the method of claim 1.

\* \* \* \* \*